(12) United States Patent
Dhandhania (10) Patent No.: US 10,625,847 B2
(45) Date of Patent: Apr. 21, 2020

(54) SPLIT WINGLET

(71) Applicant: Bell Helicopter Textron Inc., Fort Worth, TX (US)

(72) Inventor: Anmol Dhandhania, Pune (IN)

(73) Assignee: Textron Innovations Inc., Providence, RI (US)

(*) Notice: Subject to any disclaimer, the term of this patent is extended or adjusted under 35 U.S.C. 154(b) by 289 days.

(21) Appl. No.: 15/494,071

(22) Filed: Apr. 21, 2017

(65) Prior Publication Data

US 2018/0304997 A1 Oct. 25, 2018

(51) Int. Cl.
*B64C 23/06* (2006.01)
*B64C 27/467* (2006.01)
*B64C 27/46* (2006.01)

(52) U.S. Cl.
CPC .......... *B64C 23/069* (2017.05); *B64C 23/065* (2013.01); *B64C 27/463* (2013.01); *B64C 27/467* (2013.01)

(58) Field of Classification Search
CPC ... B64C 23/069; B64C 27/463; B64C 27/467; B64C 23/065
USPC ...................................... 244/199.4
See application file for complete search history.

(56) References Cited

U.S. PATENT DOCUMENTS

| 5,992,793 | A | * | 11/1999 | Perry | B64O 27/463 244/17.11 |
| 6,168,383 | B1 | * | 1/2001 | Shimizu | B64O 27/463 415/119 |
| 6,578,798 | B1 | * | 6/2003 | Dizdarevic | B64O 23/069 244/199.1 |
| 8,936,219 | B2 | * | 1/2015 | Roman | B64O 5/10 244/199.4 |
| 9,302,766 | B2 | * | 4/2016 | Gratzer | B64O 23/069 |
| 9,988,142 | B2 | * | 6/2018 | Heller | B64O 23/065 |
| 2009/0084904 | A1 | * | 4/2009 | Detert | B64O 23/065 244/199.4 |
| 2015/0003994 | A1 | * | 1/2015 | Braaten | F03D 1/0633 416/237 |

* cited by examiner

*Primary Examiner* — James S Bergin
(74) *Attorney, Agent, or Firm* — Lightfoot & Alford PLLC (57) ABSTRACT

A split winglet has a leading airfoil (LA) comprising a LA leading edge, a LA trailing edge, a LA upper surface, and a LA lower surface. The split winglet also has a trailing airfoil (TA) comprising a TA leading edge, a TA trailing edge, a TA upper surface, and a TA lower surface. The split winglet further has a base connected to each of the LA and the TA, the base being configured for connection to a tip of a main airfoil.

18 Claims, 10 Drawing Sheets

SPLIT WINGLET

BACKGROUND

Aircraft, such as, but not limited to, helicopters and fixed wing airplanes, are restricted in payload capacity, range, speed, and other performance characteristics as a function of the aerodynamic efficiency of the aircraft components. Some aircraft are configured with winglets at the tip of wings to improve the aerodynamic efficiency of the wings, however, further improved aerodynamic efficiency is a constant goal of aircraft designers.

DETAILED DESCRIPTION

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
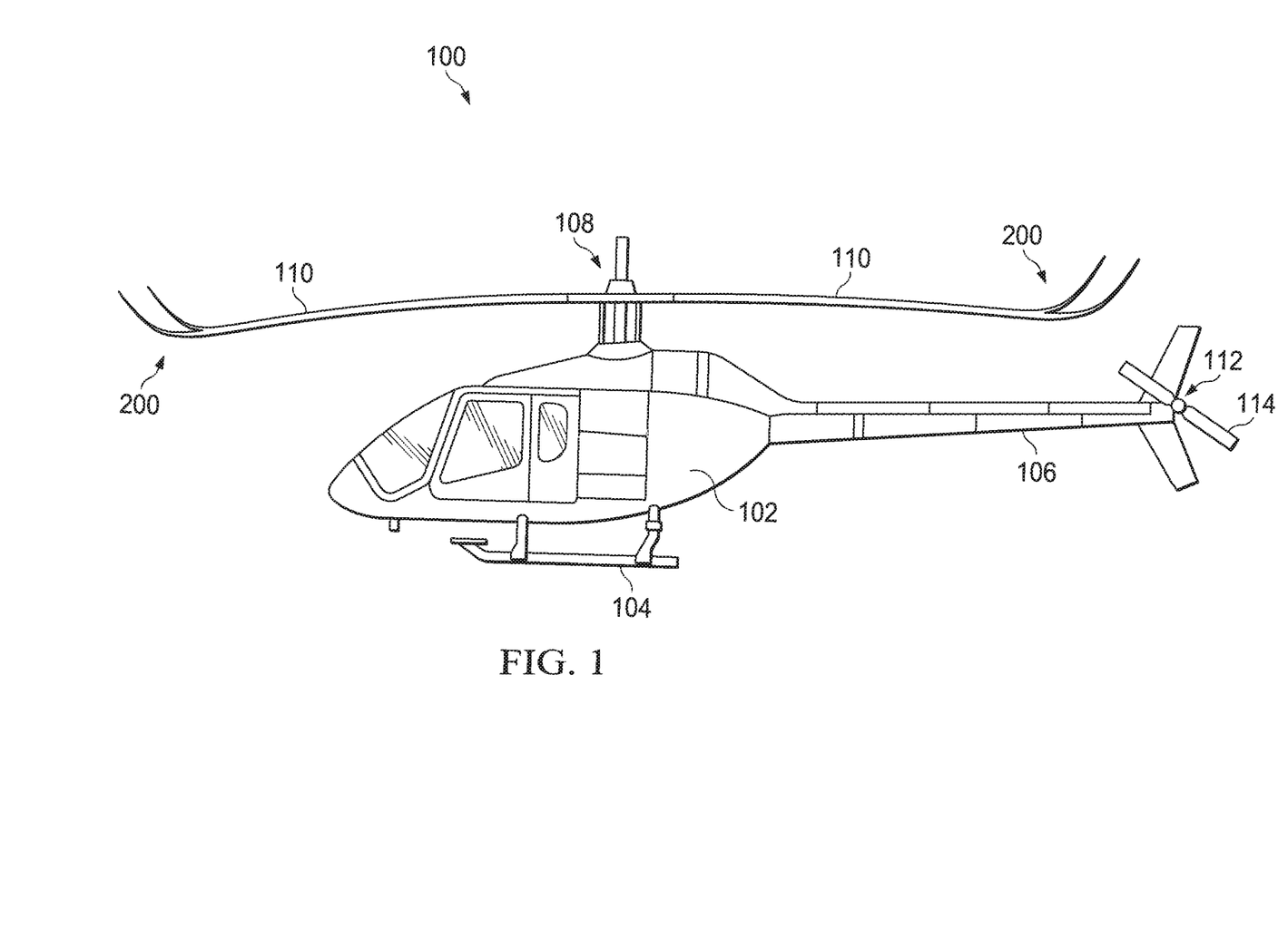
FIG. 1 is an orthogonal left side view of a helicopter according to an embodiment of this disclosure.
Figure 2:
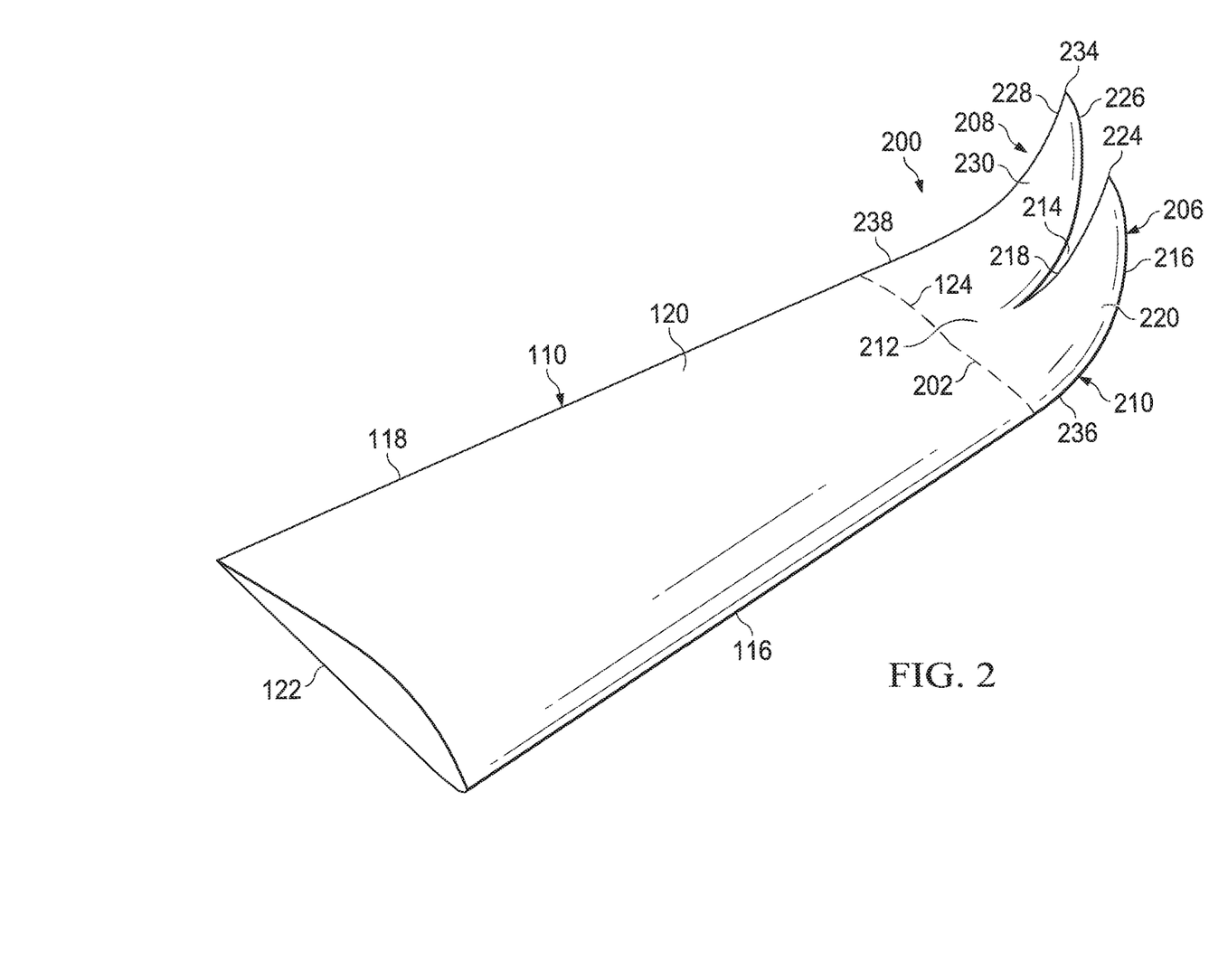
FIG. 2 is a partial front oblique view of a rotor blade of the helicopter of FIG. 1 attached to a split winglet according to an embodiment of this disclosure.
Figure 3:
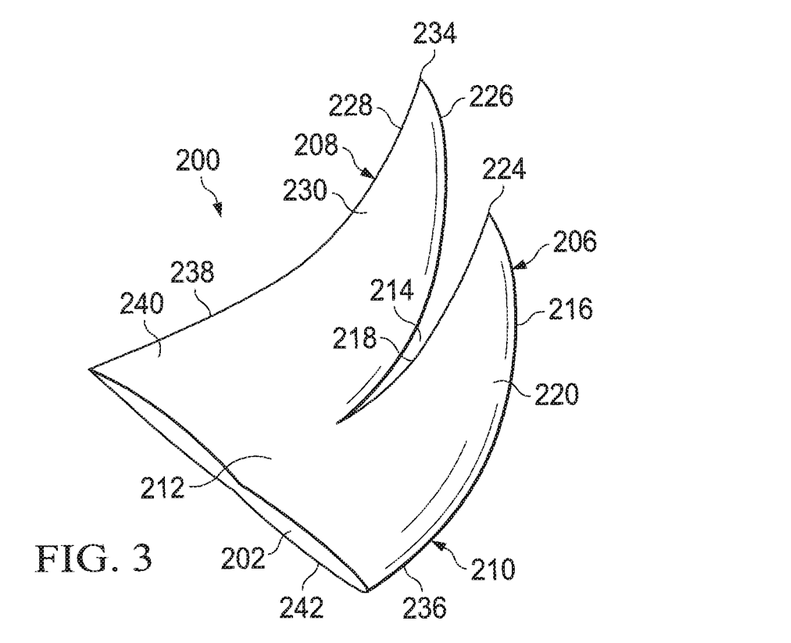
FIG. 3 is a front-top oblique view of the split winglet of FIG. 2.
Figure 4:
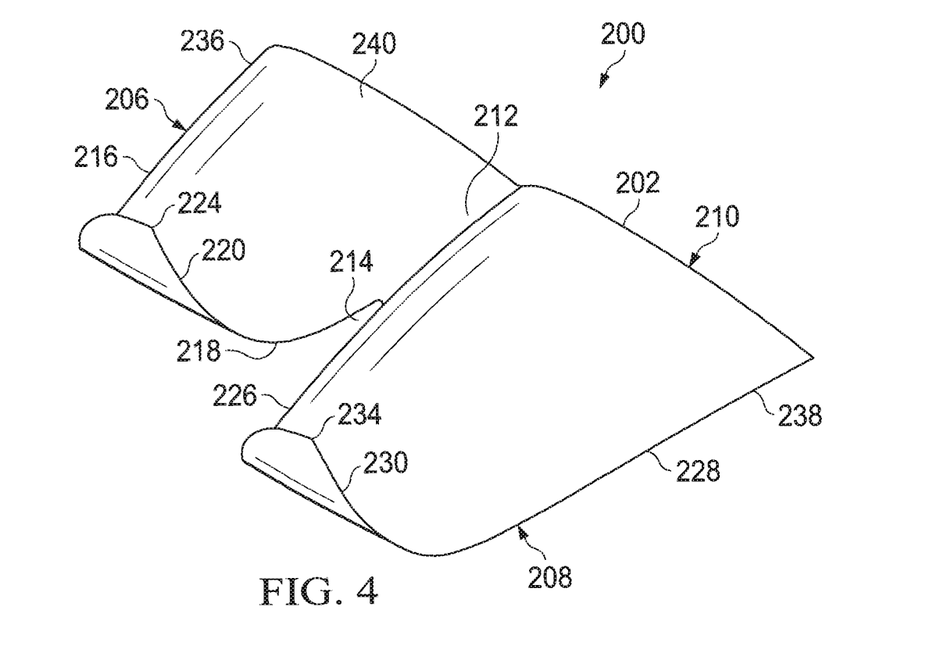
FIG. 4 is a rear-right oblique view of the split winglet of FIG. 2.

Referring to FIG. 1 in the drawings, a helicopter 100 is illustrated. Helicopter 100 can include a fuselage 102, a landing gear 104, a tail member 106, a main rotor system 108 comprising main rotor blades 110, and a tail rotor system 112 comprising tail rotor blades 114. The main rotor blades 110 and the tail rotor blades 114 can be rotated and selectively controlled in order to selectively control direction, thrust, and lift of helicopter 100. In this embodiment, each main rotor blade 110 comprises a split winglet 200.

Referring now to FIGS. 2-8 in the drawings, the split winglet 200 is shown in greater detail. The main rotor blade 110 comprises a leading edge 116, a trailing edge 118, an upper surface 120, a lower surface 122, and an outboard end 124. The split winglet 200 generally comprises an inboard end 202 configured for connection to the main rotor blade 110. Because of the complicated structure of the split winglet 200, the split winglet 200 can be described as comprising a leading airfoil 206 and a trailing airfoil 208 that share a base 210 that comprises the inboard end 202. Each of the leading airfoil 206 and the trailing airfoil 208 can be referred to as comprising blended winglets insofar as the leading airfoil 206 and the trailing airfoil 208 are both attached to the main rotor blade 110 with smooth curves instead of sharp angles and are intended to reduce interference drag at the junction between the main rotor blade 110 and the inboard end 202 of the base 210. Rather than each of the leading airfoil 206 and the trailing airfoil 208 individually connecting to the main rotor blade 110, the split winglet 200 generally provides a bridge 212 between the leading airfoil 206 and the trailing airfoil 208. The bridge 212 generally extends from the inboard end 202 away from the main rotor blade 110 until the leading airfoil 206 and the trailing airfoil 208 profiles diverge to create a gap 214. The base 210 can be considered to extend from the inboard end 202 away from the main rotor blade 110 a distance until the bridge 212 is discontinued where the gap 214 begins.

The leading airfoil (LA) 206 generally comprises a LA leading edge 216, a LA trailing edge 218, a LA upper surface 220, a LA lower surface 222, and a LA tip 224. The trailing airfoil (TA) 208 generally comprises a TA leading edge 226, a TA trailing edge 228, a TA upper surface 230, a TA lower surface 232, and a TA tip 234. The base 210 generally comprises a base leading edge 236, a base trailing edge 238, a base upper surface 240, and a base lower surface 242.

Figure 5:
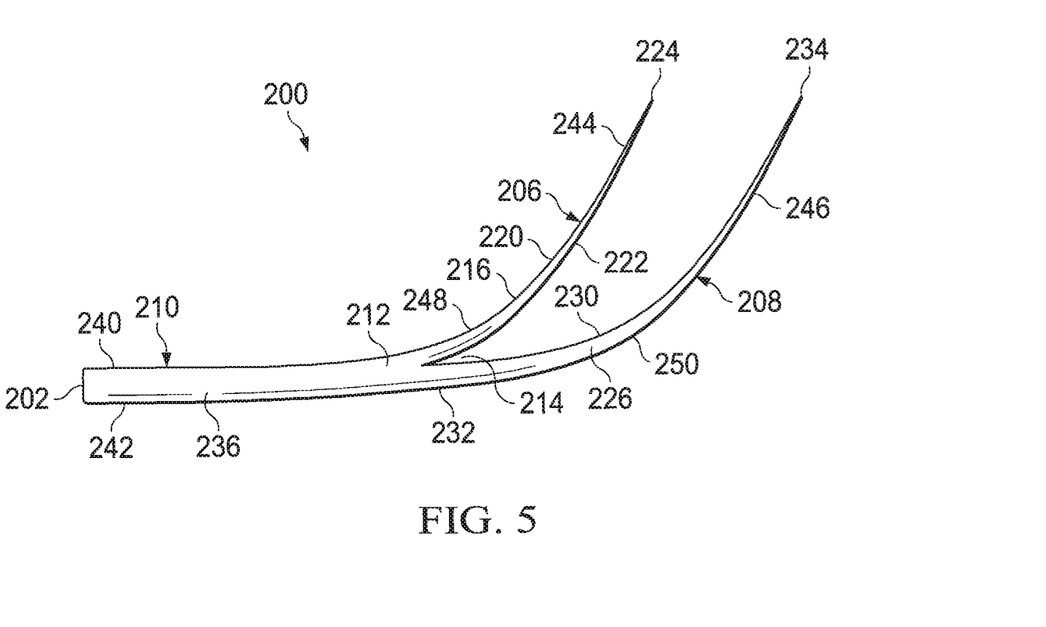
FIG. 5 is an orthogonal front view of the split winglet of FIG. 2.
Figure 6:
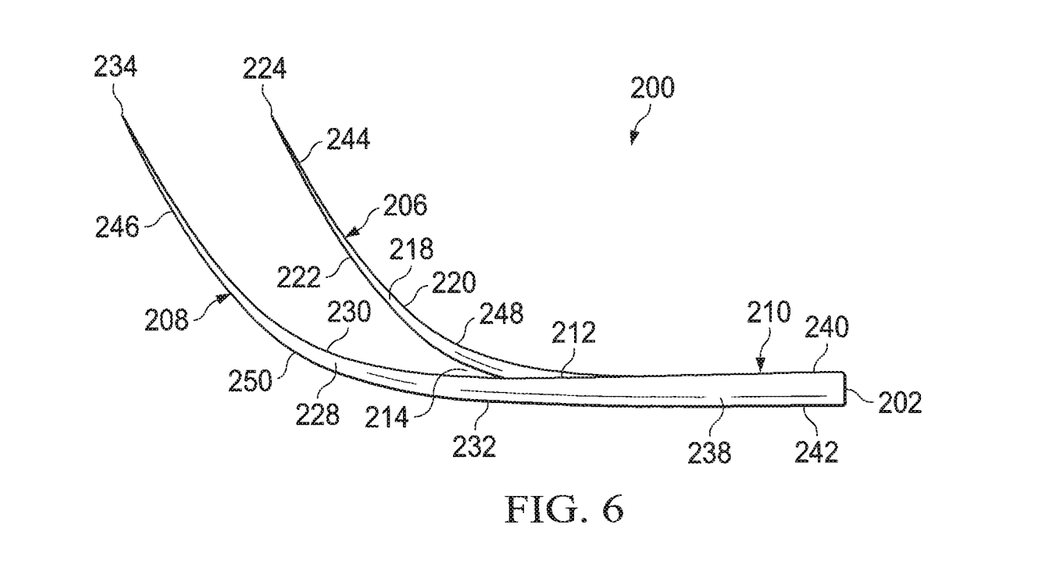
FIG. 6 is an orthogonal rear view of the split winglet of FIG. 2.
Figure 7:
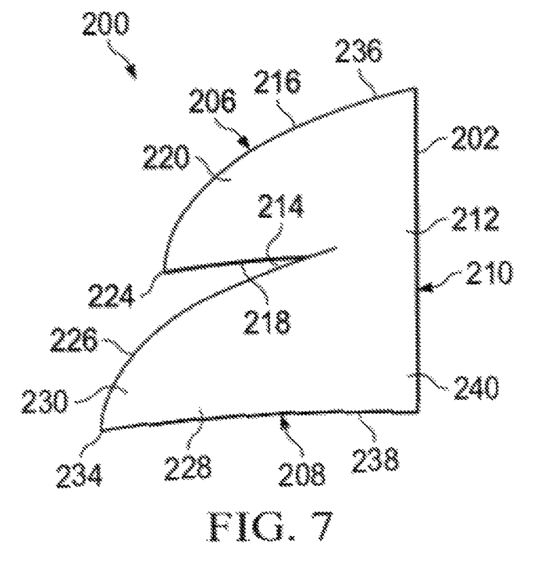
FIG. 7 is an orthogonal top view of the split winglet of FIG. 2.
Figure 8:
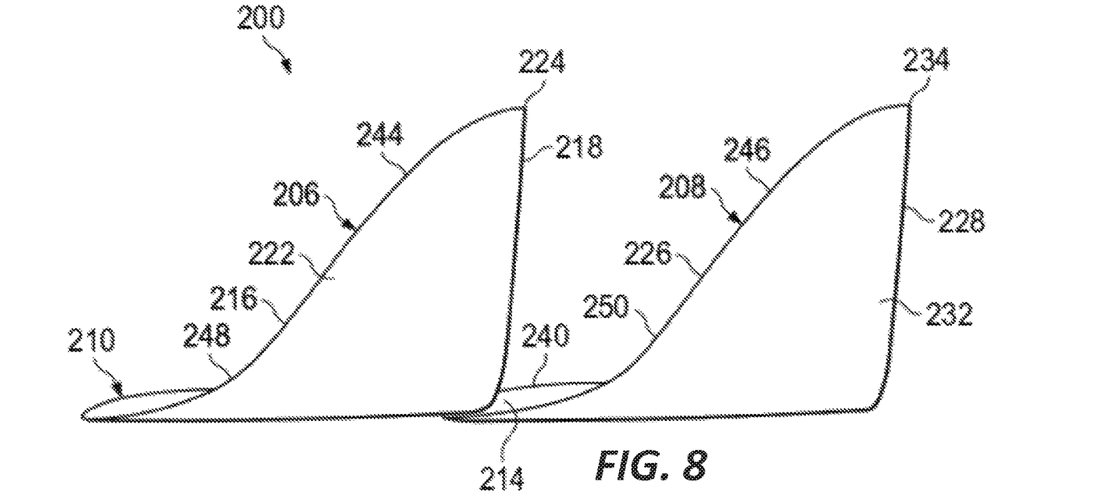
FIG. 8 is an orthogonal right view of the split winglet of FIG. 2.

The leading airfoil 206 and the trailing airfoil 208 are attached to the base 210 and the base 210 is attached to the main rotor blade 110 in a manner configured to achieve minimum induced drag for the sizes and shapes of the split wingtip 200. The leading airfoil 206 comprises a substantially straight LA section 244 and the trailing airfoil 208 comprises a substantially straight TA section 246. The straight LA section 244 is joined to the base 210 by a curved LA section 248 and the straight TA section 246 is joined to the base 210 by a curved TA section 250. The straight and curved nature of the straight sections 244, 246 and curved sections 248, 250, respectively, is best shown in FIGS. 5 and 6. The curved sections 248, 250 are designed to obtain an optimum aerodynamic loading. Surface streamwise cross-sections are airfoils having appropriate thickness, camber and twist variations. The curved LA section 248 and the curved TA section 250 feature a smoothly varying chord distribution which blends smoothly and continuously with the main rotor blade 110 and with the adjoining straight LA section 244 and straight TA section 246, respectively. The curved LA section 248 and the curved TA section 250 also feature limited in-plane curvature (i.e., large radius) to accommodate a large chord variation and to provide a practical means of achieving optimum aerodynamic loading. The curved LA section 248 and the curved TA section 250 also minimize aerodynamic interference and undesirable flow separation and compressibility effects.

The split winglet 200 is split to achieve maximum drag reduction and performance improvement while maintaining favorable characteristics over a range of operating conditions. The drag of a rotor blade (or aircraft wing) arises from a number of sources, one of which, in the context of a fixed wing aircraft is a trailing vortex system which can account for up to one-half the total drag for a subsonic airplane in optimum cruise flight. It has long been recognized that this so-called induced drag is directly associated with rotor blade (or wing) lift and load variation along the length of the rotor blade (or wing span). This condition corresponds to a flow that manifests as a vorticity sheet shed downstream of the rotor blade (or wing) trailing edge (i.e., the trailing vortex system) that is very intense near the rotor blade (or wing) tip. In this embodiment, the split winglet 200 provides a structurally continuous contour shape when viewed along the airstream direction. For a fixed wing aircraft, split winglets 200 can be installed on each wing tip with right and left hand (mirror image) configurations on opposite tips. The lateral and vertical dimensions of the split winglets 200 can comprise any values consistent with the overall design objectives and practical considerations which may limit the size and form of the split winglets 200. Accordingly, the split winglets 200 provide twisted and cambered surfaces that produce an optimum distribution of load on the leading airfoil 206 and the trailing airfoil 208. In combination with appropriate rotor blade (or wing) lift distribution, this will yield minimum induced drag for given total lift and rotor blade length (or wing span). The split winglets 200 greatly reduce the intensity of the wake vorticity trailing from a lifting surface thereby reducing induced drag. Furthermore, the reduced wake intensity can substantially alleviate noise generation due to interference of the vorticity with other moving surfaces. While the split winglets 200 are primarily described above as being associated with main rotor blades 110 of a helicopter 100, the split winglets 200 can be incorporated in any apparatus or machine that employs lifting surfaces (or airfoils) whether static or dynamic. Accordingly, it can be advantageously utilized with fixed wing aircraft, helicopters, propeller blades, fans, wind power turbine blades, cooling fan blades, aerodynamic spoilers, and other devices utilizing airfoils.

Figure 9:
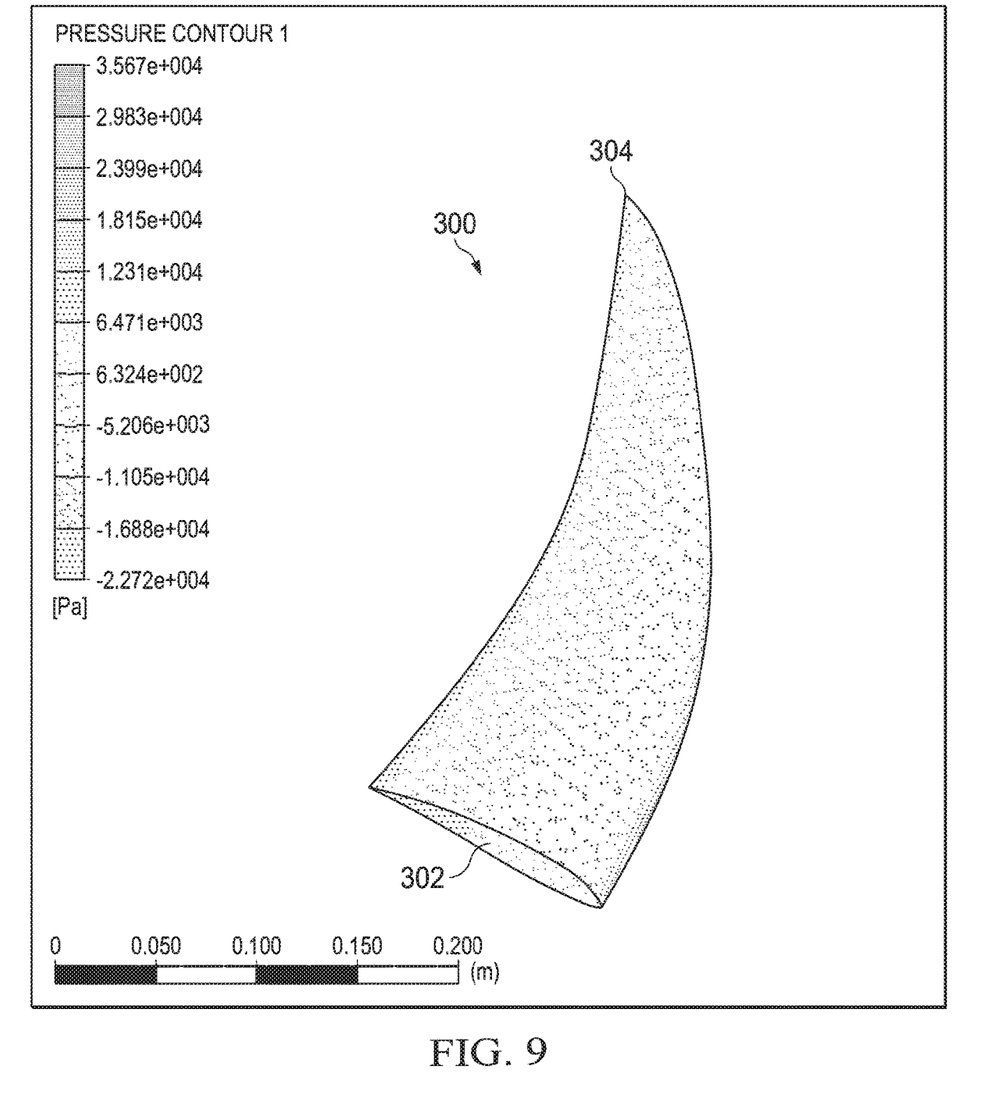
FIG. 9 is a graphical representation of a simulated pressure contour of a single conventional winglet having a substantially similar curvature to the split winglet of FIG. 2.
Figure 10:
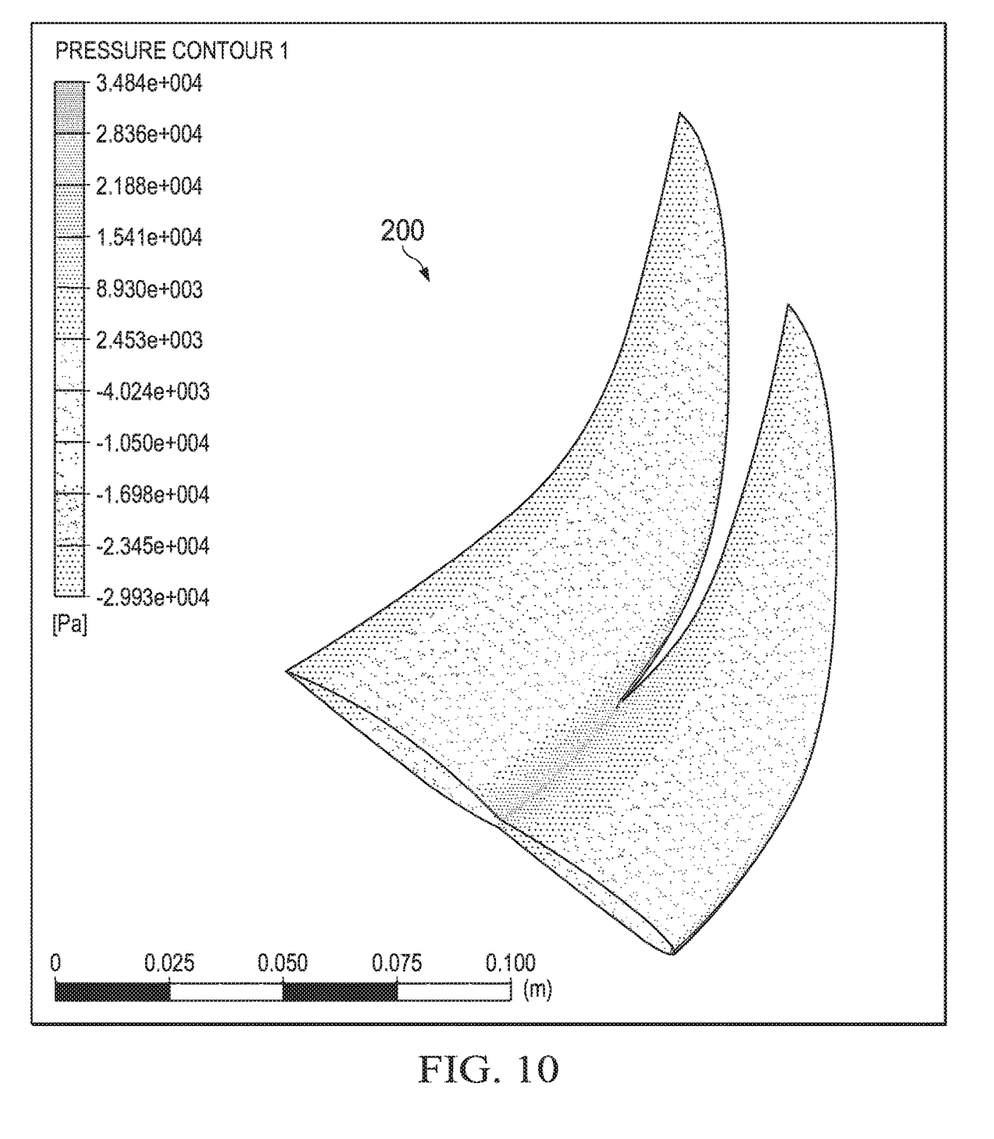
FIG. 10 is a graphical representation of a simulated pressure contour of the split winglet of FIG. 2.

Referring now to FIG. 9, a simulated pressure distribution of a conventional winglet 300 (not split) is shown. The conventional winglet 300 generally comprises a total chordwise distance substantially similar to the base 210 of the split winglet 200 and generally smoothly transitions from an inboard end 302 to a tip 304. Referring now to FIG. 10, a simulated pressure distribution of the split winglet 200 is shown. In comparison, the split winglet 200 provides a relatively more even pressure distribution.

Figure 11:
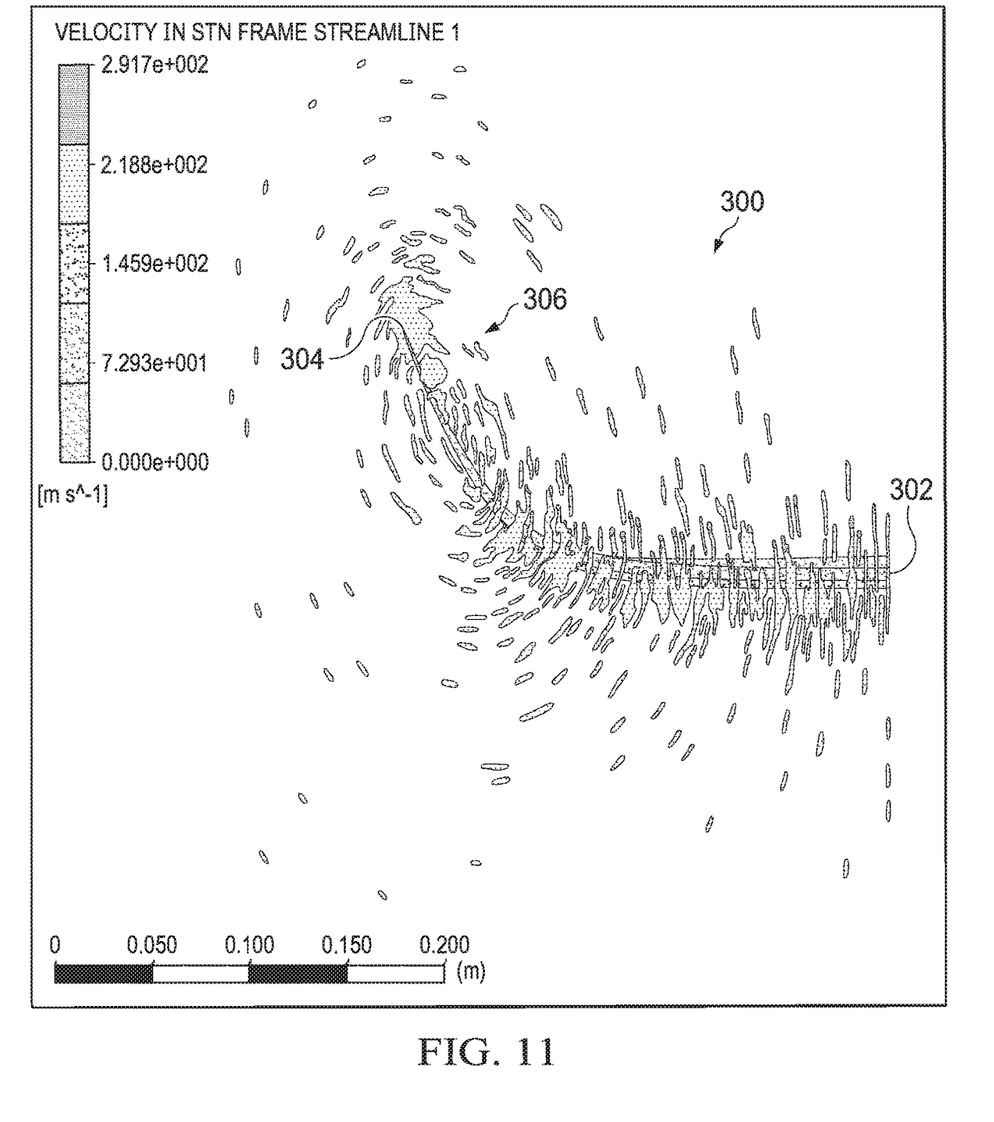
FIG. 11 is a graphical representation of a simulated velocity streamline of the conventional winglet of FIG. 9.
Figure 12:
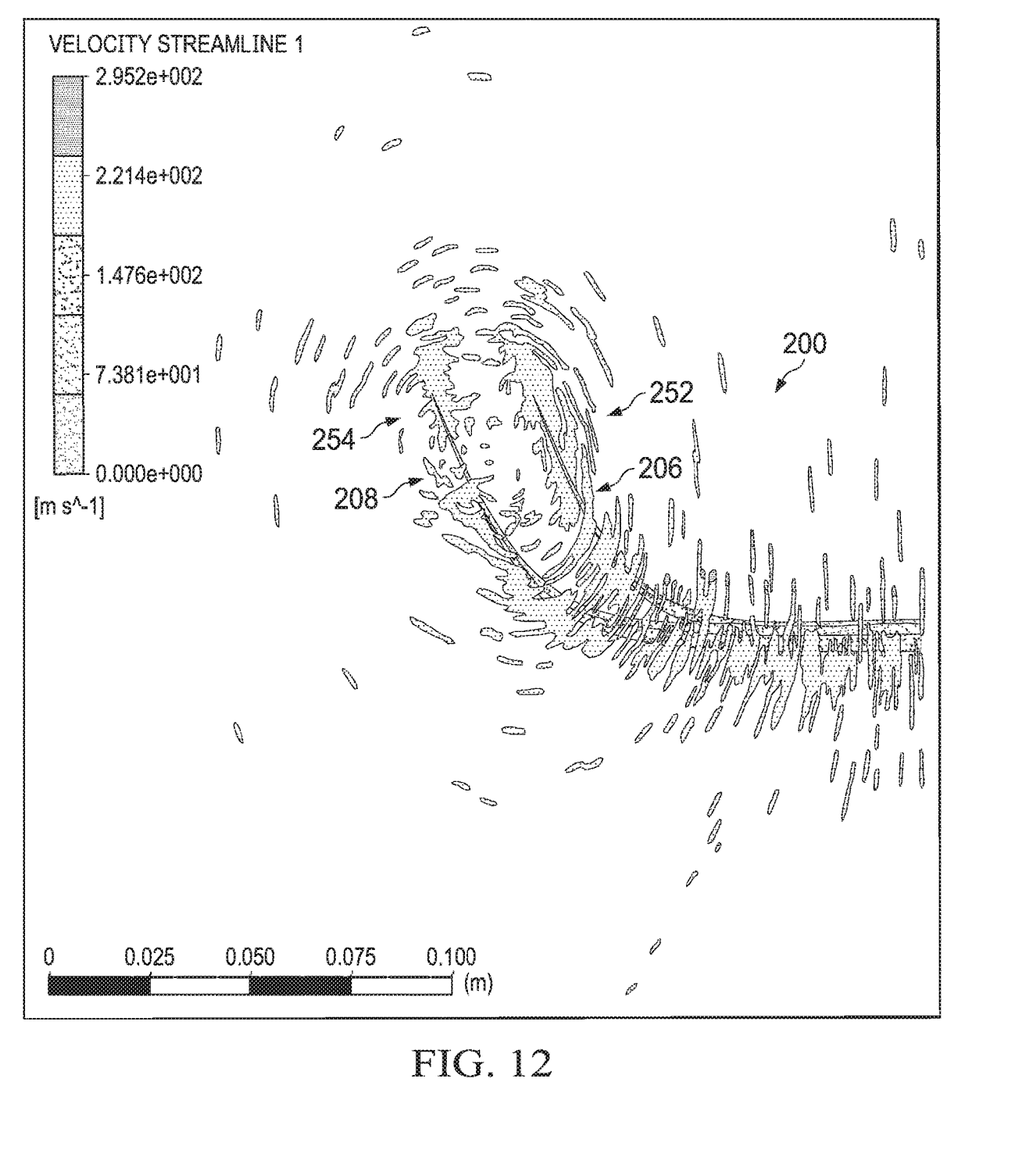
FIG. 12 is a graphical representation of a simulated velocity streamline of the split winglet of FIG. 2.

Referring now to FIG. 11, a simulated velocity streamline of the conventional winglet 200 is shown. The simulated velocity streamline shows that a tip vortex 306 is generated which can induce undesirable aerodynamic drag. Referring now to FIG. 12, a simulated velocity streamline of the split winglet 200 is shown. The simulated velocity streamline shows that each of the leading airfoil 206 and the trailing airfoil 208 generate separate tip vortices 252, 254, respectively. However, the tip vortices 252, 254 actually counter each other, thereby reducing overall aerodynamic drag as compared to the conventional example of FIG. 11.

In wind tunnel and simulation testing, using the split winglet 200 as opposed to a conventional (not split) winglet 300 can improve the aerodynamic efficiency (or Lift/Drag Ratio) of a rotor blade (or wing) by about 36% which can result in a fuel savings of about 15%-17%. More specifically, when the main rotor blade 110 was equipped with a split winglet 200 rather than a conventional winglet 300, lift was increased by about 13.57% (from 30.34 N to 34.46 N) and drag was decreased by about 17.01% (from 4.29 N to 3.56 N). Accordingly, the Lift/Drag Ratio was increased by about 36.91% (from 7.07 to 9.68).

Figure 13:
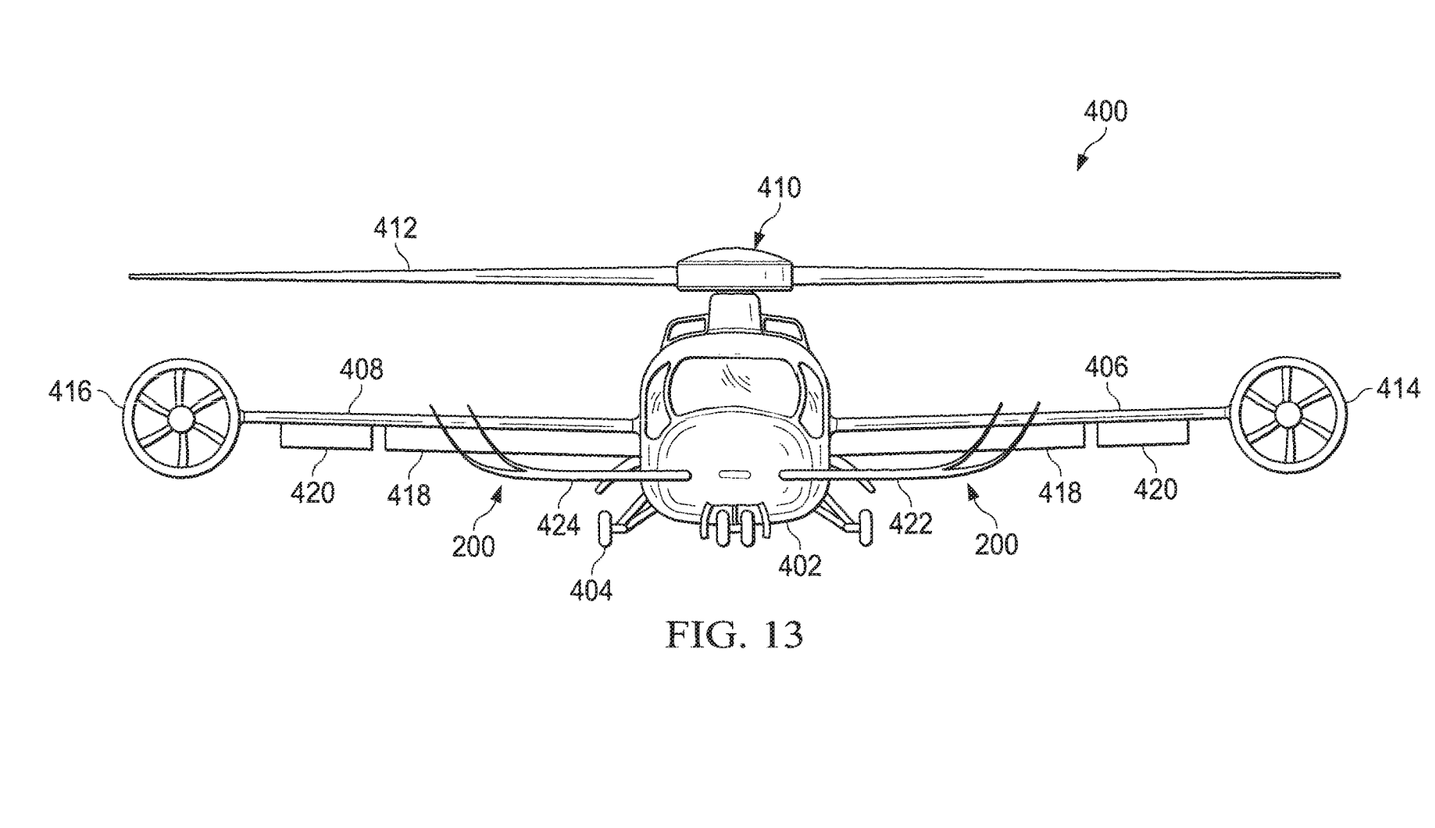
FIG. 13 is an orthogonal front view of a rotorcraft 400 according to another embodiment of this disclosure.

Referring to FIG. 13 in the drawings, a rotorcraft 400 according to another embodiment of this disclosure is shown. Rotorcraft 400 comprises a fuselage 402, a landing gear 404, a left wing 406, a right wing 408, a main rotor system 410 comprising main rotor blades 412, a first fan 414 carried by the left wing 406, and a second fan 416 carried by the right wing 408. Each of the left wing 406 and the right wing 408 comprise an inner flaperon 418 and an outer flaperon 420. The main rotor blades 412, first fan 414, second fan 416, inner flaperons 418, and outer flaperons 420 can be controlled in order to selectively control direction, thrust, and lift of rotorcraft 400. The rotorcraft 400 further comprises a left stabilizer wing 422 and a right stabilizer wing 424, each comprising a split winglet 200 attached thereto. In this embodiment, the rotorcraft 400 comprises a manned helicopter, but in alternative embodiments, the rotorcraft 400 can comprise an unmanned helicopter, a unmanned aerial vehicle, a drone and/or any other aircraft.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A split winglet, comprising:
    a leading airfoil (LA) comprising a LA leading edge, a LA trailing edge, a LA upper surface, a LA lower surface, and a LA tip;
    a trailing airfoil (TA) comprising a TA leading edge, a TA trailing edge, a TA upper surface, a TA lower surface, and a TA tip; and a base connected to each of the LA and the TA, the base being configured for connection to a tip of a main airfoil;

wherein the LA tip and the TA tip extend to substantially a same vertical height.

2. The split winglet of claim 1, wherein the LA trailing edge is located upstream relative to the TA leading edge.

3. The split winglet of claim 1, wherein a gap exists between the LA and the TA when the split winglet is viewed from above or below.

4. The split winglet of claim 1, wherein a gap exists between the LA lower surface and the TA upper surface when the split winglet is viewed from the front or back.

5. The split winglet of claim 1, wherein the LA comprises a substantially straight LA section and the TA comprises a substantially straight TA section.

6. The split winglet of claim 5, wherein the straight LA section is located inboard relative to the straight TA section.

7. The split winglet of claim 5, wherein the straight LA section is joined to the base by a curved LA section.

8. The split winglet of claim 7, wherein the straight TA section is joined to the base by a curved TA section.

9. The split winglet of claim 1, wherein the main airfoil comprises a main rotor blade of a helicopter.

10. The split winglet of claim 1, wherein the main airfoil comprises a wing of a fixed wing aircraft.

11. A helicopter, comprising:
  a main rotor system comprising a main rotor blade comprising and outboard end; and
  a split winglet attached to the outboard end, the split winglet comprising:
    a leading airfoil (LA) comprising a LA leading edge, a LA trailing edge, a LA upper surface, a LA lower surface, and a LA tip;
    a trailing airfoil (TA) comprising a TA leading edge, a TA trailing edge, a TA upper surface, a TA lower surface, and a TA tip; and
    a base connected to each of the LA and the TA, the base being configured for connection to a tip of a main airfoil;
    wherein the LA tip and the TA tip extend to substantially a same vertical height.

12. The helicopter of claim 11, wherein the LA trailing edge is located upstream relative to the TA leading edge.

13. The helicopter of claim 11, wherein a gap exists between the LA and the TA when the split winglet is viewed from above or below.

14. The helicopter of claim 11, wherein a gap exists between the LA lower surface and the TA upper surface when the split winglet is viewed from the front or back.

15. The helicopter of claim 11, wherein the LA comprises a substantially straight LA section and the TA comprises a substantially straight TA section.

16. The helicopter of claim 15, wherein the straight LA section is located inboard relative to the straight TA section.

17. The helicopter of claim 15, wherein the straight LA section is joined to the base by a curved LA section.

18. The helicopter of claim 17, wherein the straight TA section is joined to the base by a curved TA section.

* * * * *